US010579844B2

(12) United States Patent
Wright (10) Patent No.: US 10,579,844 B2
(45) Date of Patent: Mar. 3, 2020

(54) SYSTEMS AND METHODS FOR DATA TRANSFER IN DISTRIBUTED ENVIRONMENTS

(71) Applicant: Walmart Apollo, LLC, Bentonville, AR (US)

(72) Inventor: Cameron Lloyd Wright, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 21 days.

(21) Appl. No.: 16/046,639

(22) Filed: Jul. 26, 2018

(65) Prior Publication Data

US 2019/0034682 A1 Jan. 31, 2019

Related U.S. Application Data

(60) Provisional application No. 62/537,620, filed on Jul. 27, 2017.

(51) Int. Cl.
*G06K 7/14* (2006.01)
*G06Q 10/08* (2012.01)
(Continued)

(52) U.S. Cl.
CPC ......... *G06K 7/1417* (2013.01); *G06K 7/1413* (2013.01); *G06Q 10/087* (2013.01); *G06Q 30/0601* (2013.01); *H04L 67/10* (2013.01)

(58) Field of Classification Search
CPC ............................ G06K 7/1417; G06K 7/1413
(Continued)

(56) References Cited

U.S. PATENT DOCUMENTS 4,071,740 A 1/1978 Gogulski
5,595,264 A 1/1997 Trotta, Jr.
(Continued)

FOREIGN PATENT DOCUMENTS

KR 101321397 B1 10/2013

OTHER PUBLICATIONS

New Walmart Scan & Go Tutorial, YouTube, https://www.youtube.com/watch?v=vtBtT5NmCsg, published Mar. 31, 2017.
(Continued)

*Primary Examiner* — Allyson N Trail
(74) *Attorney, Agent, or Firm* — McCarter & English, LLP; David R. Burns (57) ABSTRACT

Described in detail herein are systems and methods for data transfer in a distributed environment. A terminal can display a terminal machine-readable element encoded with a terminal identifier associated with the terminal. The terminal can subscribe to a named logical channel to listen for information to be published in the at least one named logical channel. The mobile device can store in memory, information associated with each of the physical objects. The mobile device can scan the terminal machine-readable element rendered on the display of the at least one terminal. The mobile device can transfer the information associated with each of the physical objects, stored in the memory, and terminal identifier encoded in the terminal machine-readable element to the local computing system. The local computing system can publish a message including the information associated with each of the physical objects on the named logical channel.

20 Claims, 6 Drawing Sheets

(51) Int. Cl.
*G06Q 30/06* (2012.01)
*H04L 29/08* (2006.01)

(58) Field of Classification Search
USPC .............................................. 235/462.1, 383
See application file for complete search history.

(56) References Cited

U.S. PATENT DOCUMENTS

| | | | |
|---|---|---|---|
| 6,018,397 A | 1/2000 | Cloutier et al. | |
| 6,601,759 B2 | 8/2003 | Fife et al. | |
| 6,606,411 B1 | 8/2003 | Loui et al. | |
| 6,745,186 B1 | 6/2004 | Testa et al. | |
| 6,810,149 B1 | 10/2004 | Squilla et al. | |
| 6,886,101 B2 | 4/2005 | Glazer et al. | |
| 6,937,989 B2 | 8/2005 | McIntyre et al. | |
| 7,177,820 B2 | 2/2007 | McIntyre et al. | |
| 7,222,363 B2 | 5/2007 | Rice et al. | |
| 7,431,208 B2 | 10/2008 | Feldman et al. | |
| 7,587,756 B2 | 9/2009 | Peart et al. | |
| 7,716,064 B2 | 5/2010 | McIntyre et al. | |
| 8,069,092 B2 | 11/2011 | Bryant | |
| 8,239,276 B2 | 8/2012 | Lin et al. | |
| 8,572,712 B2 | 10/2013 | Rice et al. | |
| 8,814,039 B2 | 8/2014 | Bishop et al. | |
| 8,820,633 B2 | 9/2014 | Bishop et al. | |
| 8,851,369 B2 | 10/2014 | Bishop et al. | |
| 8,851,375 B2 | 10/2014 | Allard | |
| 9,004,354 B1 | 4/2015 | Amacker et al. | |
| 2005/0218218 A1* | 10/2005 | Koster | G06F 3/147 235/383 |
| 2008/0097855 A1 | 4/2008 | Rissanen | |
| 2012/0095853 A1 | 4/2012 | von Bose et al. | |
| 2014/0249947 A1* | 9/2014 | Hicks | G06Q 10/087 705/21 |
| 2015/0142591 A1 | 5/2015 | High et al. | |
| 2016/0267560 A1 | 9/2016 | Atikoglu et al. | |
| 2017/0200108 A1* | 7/2017 | Au | G06Q 10/06398 |
| 2018/0055441 A1* | 3/2018 | Candy | A61B 5/486 |
| 2018/0101833 A1* | 4/2018 | Parekh | G06Q 10/025 |
| 2018/0253682 A1* | 9/2018 | Gilman | G06Q 10/087 |
| 2019/0045025 A1 | 2/2019 | Lewis | H04L 67/306 |

OTHER PUBLICATIONS

International Search Report and Wrriten Opinion from related International Patent Application No. PCT/US2018/043847 dated Oct. 15, 2018.

* cited by examiner

SYSTEMS AND METHODS FOR DATA TRANSFER IN DISTRIBUTED ENVIRONMENTS

This application claims priority to U.S. Provisional Application No. 62/537,620 filed on, Jul. 27, 2017, the content which are hereby incorporated by reference in its entirety.

BACKGROUND

Storing and transferring information from various servers a repeated number of times can be a slow and error prone process.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain the inventive aspects of the present disclosure. In the figures.

DETAILED DESCRIPTION

Described in detail herein are systems and methods for data transfer in distributed environment. A terminal disposed in a facility can display a terminal machine-readable element encoded with a terminal identifier associated with the terminal. The terminal is in communication with a local computing system and includes a display. The terminal can subscribe to a named logical channel to listen for information to be published in the at least one named logical channel. A mobile device including a reader and a memory can execute a facility application in the facility for interacting with the local computing system.

The mobile device can scan, using the reader, one or more object machine-readable elements. Each of the one or more machine-readable elements can be associated with a physical object disposed in the facility. The mobile device can store, in memory, information associated with each of the physical objects associated with the scanned one or more object machine-readable elements. The mobile device can scan the terminal machine-readable element rendered on the display of the at least one terminal. In response to scanning the terminal machine-readable element, the mobile device can automatically transfer the information associated with each of the physical objects stored in the memory of the mobile device and the terminal identifier extracted from the scanned terminal machine-readable element to the local computing system. In response to receiving the information associated with each of the physical objects from the mobile device, the local computing system can publish a message including the information associated with each of the physical objects on the named logical channel. The local computing system can transfer the information to the at least one terminal that subscribes to the named logical channel. This configuration provides the advantageous technical solution that eliminates the need to store information associated with each of the physical objects associated with the scanned one or more object machine-readable elements on a server and/or cloud based system and eliminates a delay in providing the information to the terminal associated with storing the information on a cloud based server where a terminal scan the machine-readable element from a mobile device, transmits a request to the server, and the server subsequently transmits the list of physical objects to the terminal based on the machine-readable element. In conventional approaches, the transmission of the he information from server to the terminal in response to a request from the terminal upon scanning the machine-readable element had a delay or latency of approximately eight seconds before the information was received by the terminal and rendered on a display of the terminal. In contrast, in exemplary embodiment described herein, the latency or delay is advantageously reduced to 2.2 seconds. In this regard, the configuration reduces processing times, data transfer times, and storage requirements in a distributed system.

The named logical channel can be associated with the terminal number. The terminal can subscribe the named logical channel based on the terminal number. The terminal can detect the message published in the named logical channel, import the information of each physical object included in the message and display the information associated with each physical object on the display. The local computing system includes a server and a controller. The server can generate the message and transmit the message to the controller. The controller can format the message prior to publishing the message.

The mobile device can decode an object identifier from each of the one or more object machine-readable elements. The mobile device can transmit the decoded object identifiers to the local computing system. The mobile device can receive the information of each physical object, in response to transmitting each decoded identifier to the local computing system display the information of each physical object on the display. In some embodiments, the local system does not maintain or store a record of the information being transmitted to the mobile device and/or does not maintain an association between the information being transmitted to the mobile device and an identifier associated with the mobile device. The mobile device can decode the terminal number from the scanned terminal machine-readable element and transmit the terminal number to the local computing system. The local computing system can determine the at least one named local channel to which to publish the message based on the terminal number.

Figure 1A:
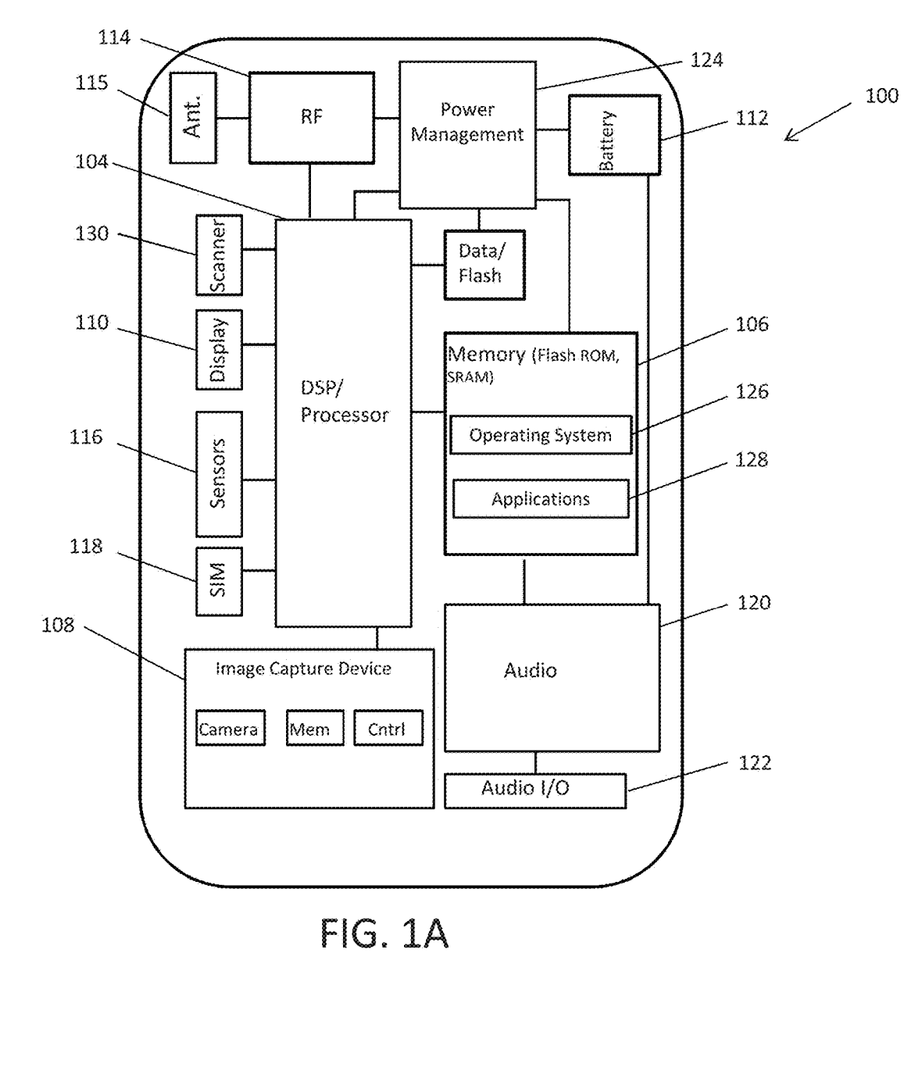
FIG. 1A is a block diagram of a mobile device that can be utilized to implement and/or interact with embodiments of a system for data transfer in a distributed environment.

FIG. 1A is a block diagram of a mobile device that can be utilized to implement and/or interact with embodiments of a system for data transfer in a distributed environment. The mobile device 100 can be a smartphone, tablet, subnotebook, laptop, personal digital assistant (PDA), handheld device, such as a Symbol® MC18 and/or any other suitable mobile device that can be programmed and/or configured to implement and/or interact with embodiments of the system via wireless communication. For example, the mobile device 100 can be a Symbol® MC18. Symbol® MC18 can be a handheld mobile computer configured to execute the Android and/or Windows operating system. The Symbol® MC18 can include 1D and 2D Scanner, Wi-Fi (802.11a/b/g/n), Camera, VGA Display, Android 2.3 and/or Windows 7, 1 GB RAM/8 GB Flash, Standard Battery.

The mobile device 100 can include a processing device 104, such as a digital signal processor (DSP) or microprocessor, memory/storage 106 in the form a non-transitory computer-readable medium, an image capture device 108, a touch-sensitive display 110, a power source 112, a radio frequency transceiver 114 and a reader 130. Some embodiments of the mobile device 100 can also include other common components commonly, such as sensors 116, subscriber identity module (SIM) card 118, audio input/output components 120 and 122 (including e.g., one or more microphones and one or more speakers), and power management circuitry 124.

The memory 106 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 126 and applications 128 can be embodied as computer-readable/executable program code stored on the non-transitory computer-readable memory 106 and implemented using any suitable, high or low level computing language and/or platform, such as, e.g., Java, C, C++, C#, assembly code, machine readable language, and the like. In some embodiments, the applications 128 can include a facility application configured to interact with the microphone, a web browser application, a mobile application specifically coded to interface with one or more servers of embodiments of the system for data transfer in a distributed environment. One or more servers are described in further detail with respect to FIG. 4. While memory is depicted as a single component those skilled in the art will recognize that the memory can be formed from multiple components and that separate non-volatile and volatile memory devices can be used.

The processing device 104 can include any suitable single- or multiple-core microprocessor of any suitable architecture that is capable of implementing and/or facilitating an operation of the mobile device 100. For example, a user can use the mobile device 100 in a facility to perform an image capture operation, capture a voice input of the user (e.g., via the microphone), transmit messages including a captured image and/or a voice input and receive messages from a computing system, display data/information including GUIs of the user interface 110, captured images, voice input transcribed as text, and the like. The mobile device 100 can perform the aforementioned operations using on an internet browser executing on the mobile device, or any web-based application. The processing device 104 can be programmed and/or configured to execute the operating system 126 and applications 128 to implement one or more processes and/or perform one or more operations. The processing device 104 can retrieve information/data from and store information/data to the storage device 106.

The RF transceiver 114 can be configured to transmit and/or receive wireless transmissions via an antenna 115. For example, the RF transceiver 114 can be configured to transmit data/information, such as input based on user interaction with the mobile device 100. The RF transceiver 114 can be configured to transmit and/or receive data/information having at a specified frequency and/or according to a specified sequence and/or packet arrangement.

The touch-sensitive display 110 can render user interfaces, such as graphical user interfaces to a user and in some embodiments can provide a mechanism that allows the user to interact with the GUIs. For example, a user may interact with the mobile device 100 through touch-sensitive display 110, which may be implemented as a liquid crystal touch-screen (or haptic) display, a light emitting diode touch-screen display, and/or any other suitable display device, which may display one or more user interfaces (e.g., GUIs) that may be provided in accordance with exemplary embodiments.

The power source 112 can be implemented as a battery or capacitive elements configured to store an electric charge and power the mobile device 100. In exemplary embodiments, the power source 112 can be a rechargeable power source, such as a battery or one or more capacitive elements configured to be recharged via a connection to an external power supply.

The reader 130 can be implemented as an optical reader configured to scan and decode machine-readable elements disposed on objects. The machine-readable elements can be barcodes or QR codes encoded with identifiers. The reader 130 can scan and decode the identifier from the machine-readable elements and the mobile device 100 can transmit the identifiers to a local computing system. The local computing system can transmit information associated with the identifier to the mobile device 100 can store the information in the volatile or non-volatile memory as described above. The local computing system is described herein with respect to FIG. 3.

Figure 1B:
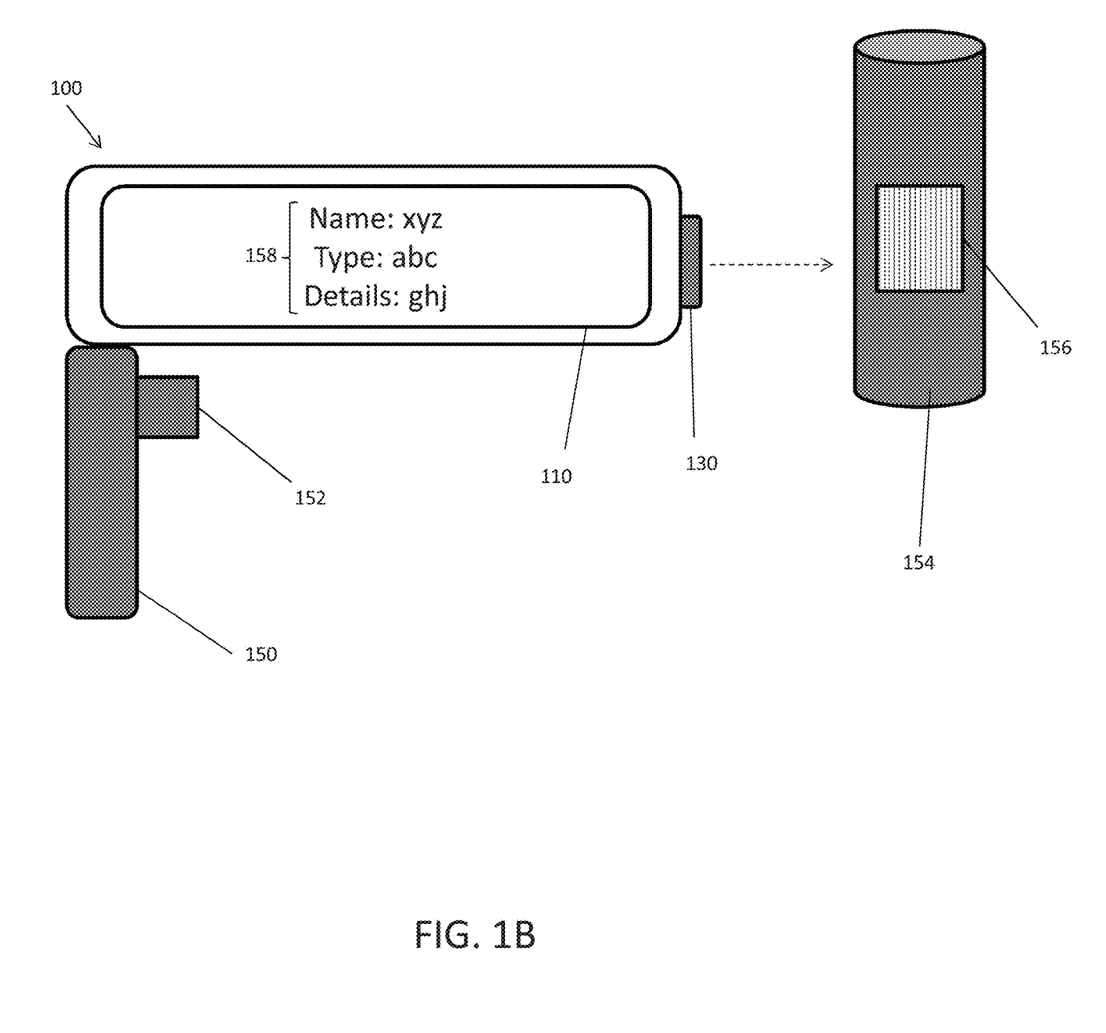
FIG. 1B illustrates an exemplary mobile device that can be utilized to implement and/or interact with embodiments of a system for data transfer in a distributed environment.

FIG. 1B illustrates an exemplary embodiment of the mobile device 100 that can be utilized to implement and/or interact with embodiments of a system for data transfer in a distributed environment. As shown in FIG. 1B, the mobile device 100 can include a handle 150 and a button 152. The handle 150 can be embodied as a gripping device to hold the mobile device 100.

A user can operate the mobile device 100 in a facility, and the graphical user interface can automatically be generated and displayed on the touch sensitive display 110 on the mobile device 100. A user can actuate the button 152 to control the operation of the reader 130 of the mobile device 100 to scan a machine-readable element 156 disposed on a physical object 154 disposed in the store. The reader 130 can decode the identifier from the machine—readable element 156, in response to the actuation of the button 152. The mobile device 100 can transmit the identifier to the local computing system to request information associated with the physical object 154 associated with the identifier of the scanned machine-readable element 156. The local computing system can retrieve and transmit the requested information associated with the physical object 154, based on the identifier, to the mobile device 100. The mobile device 100 can display the information associated with the physical object 154 on the touch-sensitive display 110 and can store a record that includes the information in memory as well as information associated with other physical objects corresponding to machine-readable elements scanned by the mobile device 100.

The information can be stored in a persistent memory of the mobile device 110, such as ROM as described above. Alternatively, or in addition to the information can be stored in temporary buffers of the mobile device such as SRAM or Flash memory as described above. The local computing system is described in further detail with respect to FIG. 3.

Figure 2:
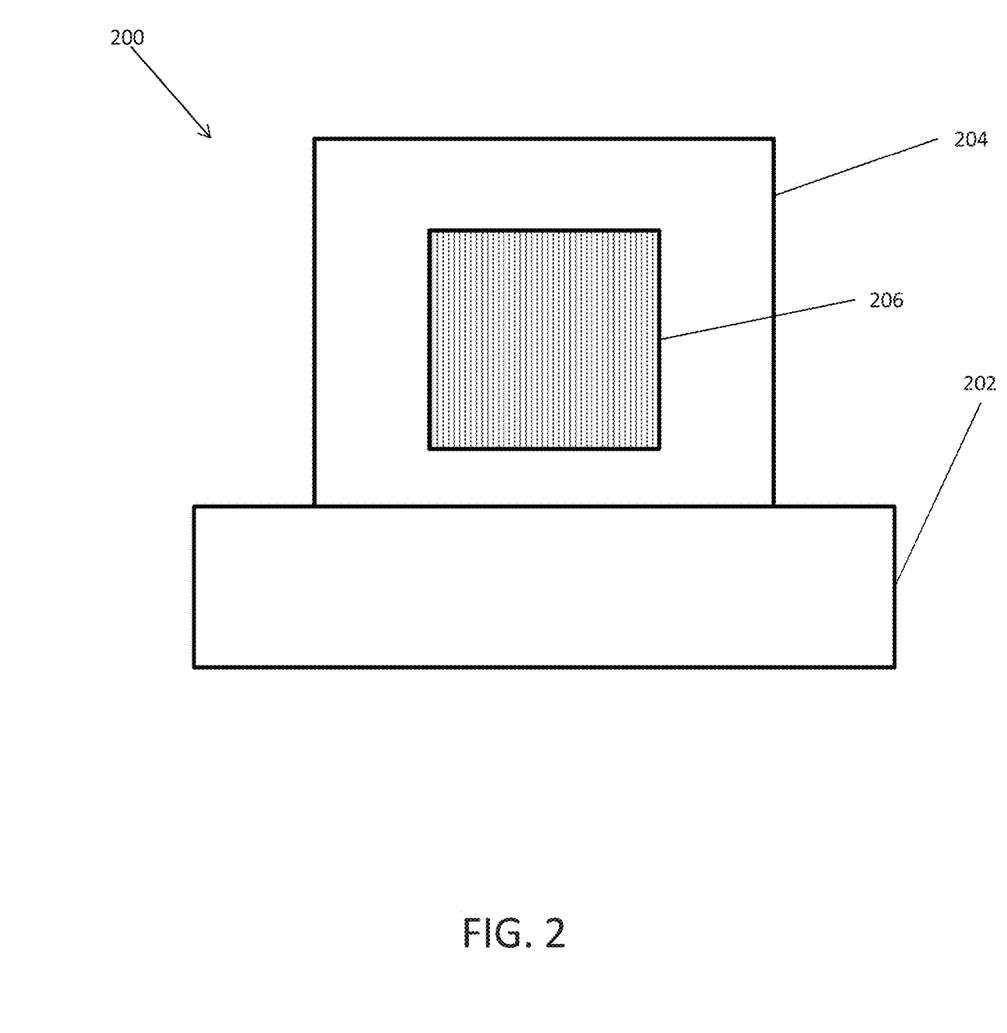
FIG. 2 illustrates a terminal disposed in a facility in accordance with an exemplary embodiment.

FIG. 2 illustrates a terminal disposed in a facility in accordance with an exemplary embodiment. The terminal 200 can include a display 204 and a processor 202. The display 204 can render a machine-readable element 206 encoded with an identifier of the terminal 200. The identifier can be a terminal number. In order to operate the terminal 200, the machine-readable element 206 can be scanned by the mobile device. The terminal 200 can subscribe to a logical channel associated with a local computing system. In response to scanning the machine-readable element by the mobile device, the terminal 200 can detect and receive a message via the logical channel. The information that forms the message is contemporaneously transferred from the mobile device to the terminal 200 via the location computing system. In response to receiving the message, the terminal 200 can become operational.

Figure 3:
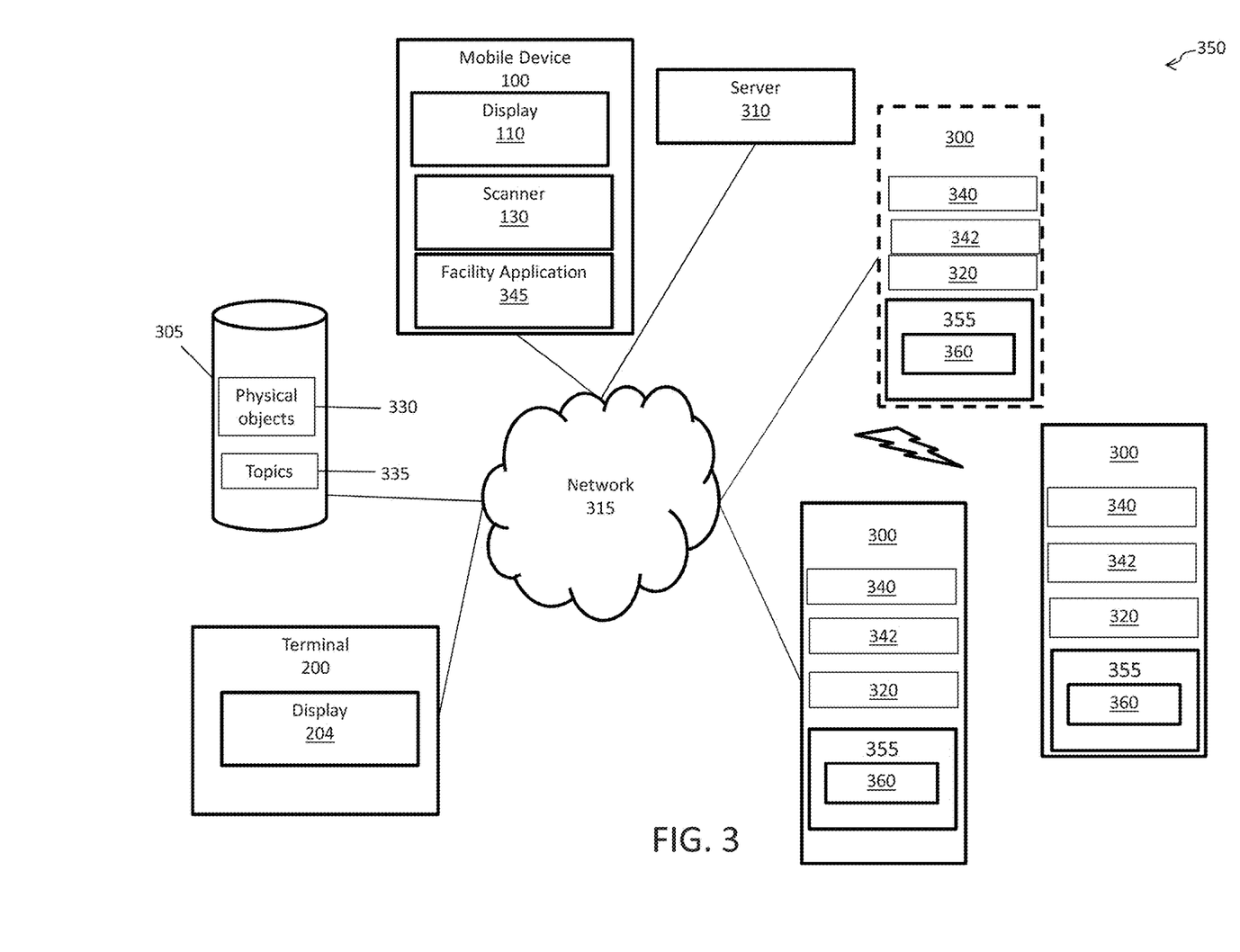
FIG. 3 illustrates a network diagram of a system for data transfer in a distributed environment in accordance with an exemplary embodiment.

FIG. 3 illustrates a network diagram of a system 350 for data transfer in a distributed environment in accordance with an exemplary embodiment. The system 350 can include one or more databases 305, one or more local computing systems 300, one or more terminals and one or more mobile devices 100, communicating over communication network 315. The local computing systems 300 can include a server 340, a controller 342, a broker system 355, and a control engine 320 can be in communication with one or more terminals 200 in a publish-subscribe network architecture, via a communications infrastructure, such as a broker system 355. The broker system 355 can include middleware software configured to store one or more named logical channels 204. The mobile device 100 can include a display 110, a reader 130, and a facility application. The terminal 200 can include a display 204. The facility application 345 can be an executable application residing on the mobile device 100. The control engine 320 can be an executable application residing on the local computing system 300 to implement the system 350 as described herein.

In an example embodiment, one or more portions of the communications network 315 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The local computing system 300 includes one or more computers or processors configured to communicate with the databases 305, and mobile devices 100, via the network 315. The local computing system 300 hosts one or more applications configured to interact with one or more components of the system 350. The databases 305 may store information/data, as described herein. For example, the databases 305 can include a physical objects database 330 and a topics database 335. The physical objects database 230 can store information associated with physical objects. The topics database 235 can store information associated with logical channels broadcast on the server 340 of the local computing system 300. The databases 305 can be located at one or more geographically distributed locations from the local computing system 300. Alternatively, the databases 305 can be included within the local computing system 300.

In one embodiment, a user can operate a mobile device 100 in a facility. Physical objects can be disposed in the facility. A machine-readable element can be disposed on or with respect to each physical object. The machine-readable element can be encoded with an identifier associated with the physical object. The mobile device 100 can execute the facility application 345. The mobile device 100 can initiate communication with the local computing system 300 in response to executing the facility application 345. Additionally, the mobile device 100 can control the operation of the reader 130 in response to executing the facility application 345. The reader 130 can scan and decode the identifier from the machine-readable element. The mobile device 100 can transmit the identifier to the local computing system 300.

The local computing system 300 can execute the control engine 320 in response to receiving the identifier. The control engine 320 can query the physical objects database 330 to retrieve information associated with the physical object, using the identifier. The control engine 320 can transmit the information to the mobile device 100. The mobile device 100 can store the information in temporary or persistent memory as described above. The mobile device 100 can store information associated with each physical object scanned by the mobile device 100 while the facility application 345 is executed. The mobile device 100 can delete information associated with each physical object in response to closing out the facility application 345. The mobile device 100 can render the information associated with the physical object received from the local computing system 300, on the display 110.

Terminals 200 can be disposed in the facility. Each terminal 200 can display a machine-readable element encoded with an identifier, on the display 204, when the terminal is non-operational. The identifier can be a terminal number. Each terminal 200 can subscribe to a named logical channel associated with their respective terminal number.

A reader 130 of a mobile device 100 can scan and decode the identifier from the machine-readable element displayed on the display 204 of a terminal 200. In response to scanning the machine-readable element displayed on the terminal, the mobile device 100 automatically transfers the stored information associated with each scanned physical object to the local computing system 300 along with the identifier and/or terminal number of the terminal 200. The server 340 of the local computing system 300 can receive the information associated with the scanned physical objects and the identifier and/or terminal number. The server 340 can query the topics database to determine the named logical channel associated with the identifier and/or terminal number. The server 340 can generate a message including the information associated with the scanned physical objects based on the named logical channel and transmit the message to the controller 342. The controller 342 can format the received message and publish the message to a named logical channel 204 associated with the identifier/terminal number, on the broker system 355. The local computing system does not store the information associated with the physical objects in persistent memory. Rather the local computing system stores the information in temporary memory which is deleted after a specified period of time.

The terminal 200 can listen for any published messages to the named logical channel associated with its identifier/terminal number. The terminal 200 can detect the message published by the controller. The terminal 200 can import and/or download the message from the named logical channel 204 in response to detecting a published message without sending a separate and distinct request to the local computing system 300 for the message. The message can include the information associated with each of the scanned physical objects. The terminal 200 can render the information associated with each of the scanned physical objects on the display 204 contemporaneously as the terminal 200 imports the message.

As a non-limiting example, the system 350 can be implemented in a retail store. A customer can operate a mobile device 100 in a retail store. Products for sale can be disposed in the retail store. The mobile device 100 can execute the facility application 345. The reader 130 can scan and decode the identifier from the machine-readable element for each product for sale. The mobile device 100 can transmit the identifier to the local computing system 300.

The local computing system 300 can execute the control engine 320 in response to receiving the identifier. The control engine 320 can query the physical objects database 330 to retrieve information associated with the product, using the identifier. The information can be name, price, type, color, size and/or quantity. The control engine 320 can transmit the information to the mobile device 100. The mobile device 100 can store information associated with each product scanned intended for purchase while the facility application 345 is executed. The mobile device 100 can delete information associated with each product in response to closing out the facility application 345. In some embodiments, the facility application 345 can include a virtual shopping cart, which includes the information of each product intended for purchase. The virtual shopping cart can be stored in temporary memory of the mobile device 100. The mobile device 100 can render the information associated with the products received from the local computing system 300, on the display 110.

Terminals 200 can be disposed in the retail store. The terminals 200 can be point of sale (POS) terminals. The reader 130 of a mobile device 100 can scan and decode the identifier from the machine-readable element displayed on the display 204 of a terminal 200. In response to scanning the machine-readable element, the mobile device 100 can automatically transfer the stored information associated with each scanned product intended for purchase from the virtual shopping cart to the local computing system 300 along with the identifier and/or terminal number of the terminal 200. The server 340 can generate a message including the information associated with the scanned products intended for sale and transmit the message to the controller 342 based on the terminal number. The controller 342 can format the received message and publish the message to a named logical channel 204 associated with the identifier/terminal number, on the broker system 355.

The terminal 200 can listen for any published messages to the named logical channel associated with its identifier/terminal number. The terminal 200 can import and/or download the message from the named logical channel 204 in response to the publication of the message. The message can include the information associated with each of the scanned products intended for sale. The terminal 200 can render the information associated with each of the scanned products intended for sale on the display 204 contemporaneously as the terminal 200 imports the message. The customer can checkout and complete the transaction, at the terminal 200.

Figure 4:
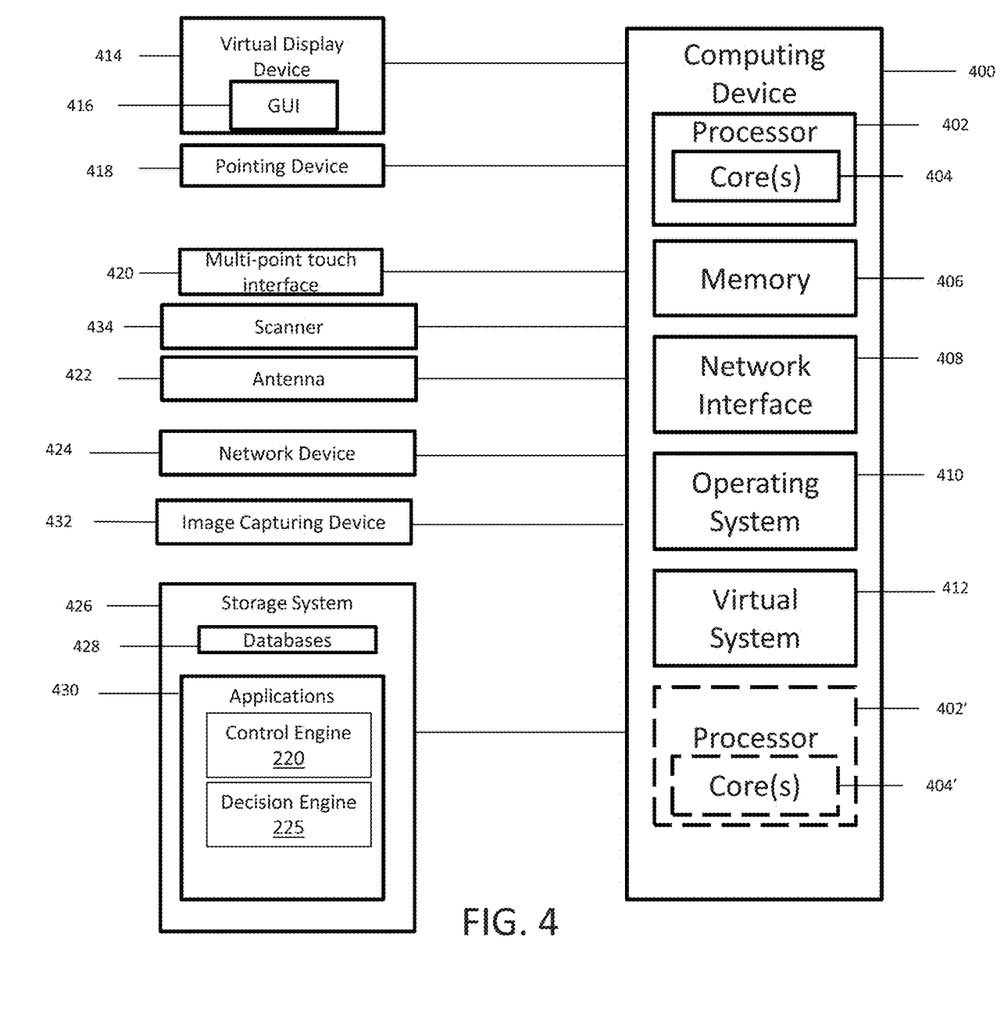
FIG. 4 illustrates a block diagram of an exemplary computing device in accordance with an exemplary embodiment.

FIG. 4 is a block diagram of an exemplary computing device suitable for implementing embodiments of the system for data transfer in a distributed environment. The computing device may be, but is not limited to, a smartphone, laptop, tablet, desktop computer, server or network appliance. The computing device 400 can be embodied as part of the local computing system and/or terminal. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 400 may store computer-readable and computer-executable instructions or software (e.g., applications 330 such as the control engine 320 and facility application 345) for implementing exemplary operations of the computing device 400. The computing device 400 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 402 and processor(s) 402' may each be a single core processor or multiple core (404 and 404') processor. Either or both of processor 402 and processor(s) 402' may be configured to execute one or more of the instructions described in connection with computing device 400.

Virtualization may be employed in the computing device 400 so that infrastructure and resources in the computing device 400 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof. The computing device 400 can receive data from input/output devices such as, a reader 334 and an image capturing device 432.

A user may interact with the computing device 400 through a visual display device 414, such as a computer monitor, which may display one or more graphical user interfaces 416, multi touch interface 420 and a pointing device 418.

The computing device 400 may also include one or more storage devices 426, such as a hard-drive, CD-ROM, or other computer readable media, for storing data and computer-readable instructions and/or software that implement exemplary embodiments of the present disclosure (e.g., applications 330 such as the control engine 320 and facility application 345). For example, exemplary storage device 426 can include one or more databases 428 for storing information regarding the physical objects and named logical channels. The databases 428 may be updated manually or automatically at any suitable time to add, delete, and/or update one or more data items in the databases.

The computing device 400 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 400 and a network and/or between the computing device 400 and other computing devices. The network interface 408 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

The computing device 400 may run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 400 and performing the operations described herein. In exemplary embodiments, the operating system 410 may be run in native mode or emulated mode. In an exemplary embodiment, the operating system 410 may be run on one or more cloud machine instances.

Figure 5:
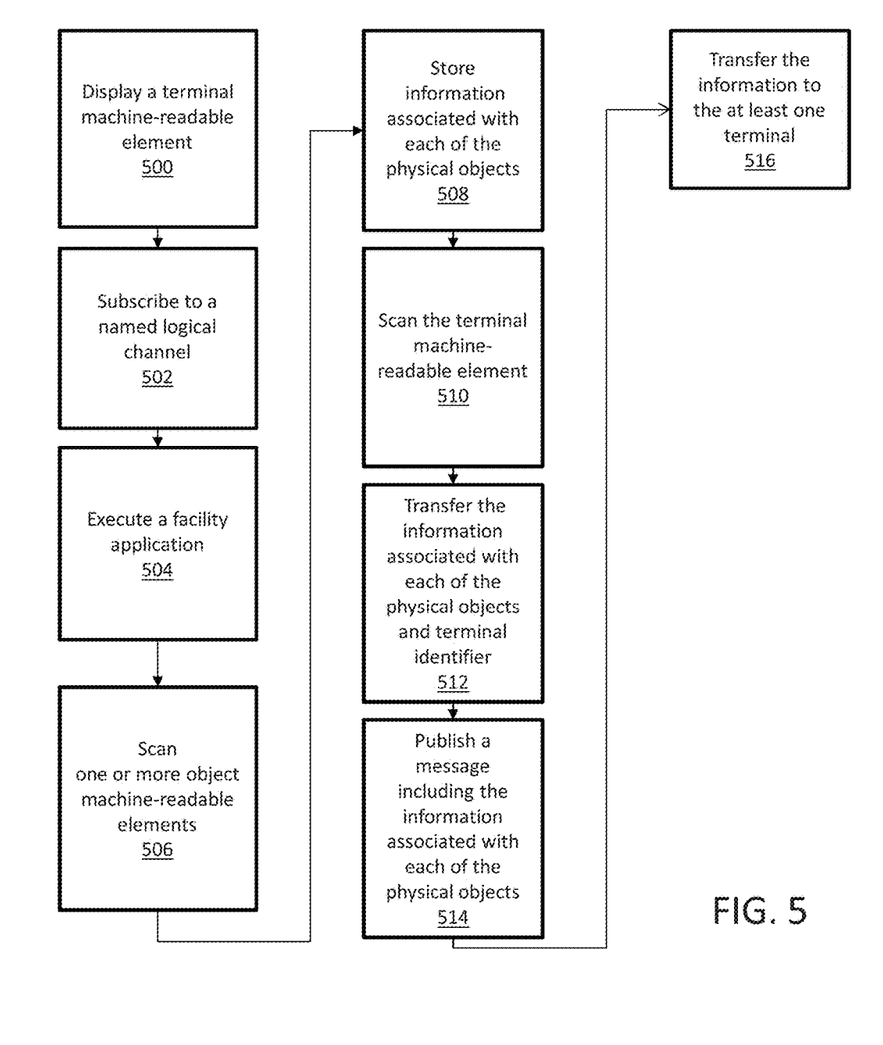
FIG. 5 is a flowchart illustrating a process implemented by a system for data transfer in a distributed environment according to an exemplary embodiment.

FIG. 5 is a flowchart illustrating a process implemented by a system for data transfer in a distributed environment according to an exemplary embodiment. In operation 500, a terminal (e.g. terminal 200 as shown in FIGS. 2 and 3) dispose in a facility can display a terminal machine-readable element (e.g. machine readable element 206 as shown in FIG. 2) encoded with a terminal identifier associated with the terminal. The terminal is in communication with a local computing system (e.g. local computing system 300 as shown in FIG. 3) via a broker system and includes a display (e.g. display 204 as shown in FIGS. 2 and 4). In operation 502, the terminal can subscribe to a named logical channel provided by the broker system to listen for information to be published in the named logical channel (e.g. named logical channels 360 as shown in FIG. 3). In operation 504, a mobile device (e.g. mobile device 100 as shown in FIGS. 1A-B and 3) including a reader (e.g. reader 130 as shown in FIGS. 1A-B and 3) and a memory (e.g. memory 106 as shown in FIG. 1A) can execute a facility application (e.g. facility application 345 as shown in FIG. 3) in the facility for interacting with the local computing system.

In operation 506, the mobile device can scan, using the reader, one or more object machine-readable elements (e.g. machine readable elements 156 as shown in FIG. 1B). Each of the one or more machine-readable elements can be associated with a physical object (e.g. physical object 154 as shown in FIG. 1B) disposed in the facility. In operation 508, the mobile device can store, in the memory of the mobile device, information associated with each of the physical objects associated with the scanned one or more object machine-readable elements. In operation 510, the mobile device can scan the terminal machine-readable element rendered on the display of the at least one terminal. The local computing system does not stores the information associated with the physical objects in persistent memory. Rather, the mobile device the information is maintained and stored by the mobile device with no corresponding or associated record of the information stored in the mobile device being stored in the local system. In operation 512, in response to scanning the terminal machine-readable element, the mobile device can automatically transfer the information associated with each of the physical objects, stored in the memory, and terminal identifier encoded in the terminal machine-readable element, to the local computing system. In operation 514, in response to receiving the information associated with each of the physical objects from the mobile device the local computing system can publish a message including the information associated with each of the physical objects on the named logical channel. In operation 516, the local computing system can transfer the information to the at least one terminal. The system for data transfer in a distributed environment, provides the advantageous technical solution that eliminates the need to store information associated with each of the physical objects associated with the scanned one or more object machine-readable elements on a server and/or cloud based system and eliminates a delay in providing the information to the terminal associated with storing the information on a cloud based server where a terminal scan the machine-readable element from a mobile device, transmits a request to the server, and the server subsequently transmits the list of physical objects to the terminal based on the machine-readable element. In conventional approaches, the transmission of the he information from server to the terminal in response to a request from the terminal upon scanning the machine-readable element had a delay or latency of approximately eight seconds before the information was received by the terminal and rendered on a display of the terminal. In contrast, in the exemplary embodiment described as described above, the latency or delay is advantageously reduced to 2.2 seconds In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A system for data transfer in a distributed environment, the system comprising:
   a local computing system including a processor, a database and a server;
   a plurality of terminals disposed in a facility, the plurality of terminals being in communication with the local computing system and each one of the plurality of terminals including a reader and a display, at least one terminal of the plurality of terminals being configured to:
      display a terminal machine-readable element encoded with a terminal identifier associated with the at least one terminal;

subscribe to at least one named logical channel of a plurality of named logical channels to listen for information to be published in the at least one named logical channel; and a plurality of mobile devices operating in the facility, the plurality of mobile devices being in communication with the local computing system, and each one of the plurality of mobile devices including a reader, a memory, and a display, at least one of the plurality of mobile devices being configured to:

execute an application for interacting with the local computing system;

scan, using the reader, one or more object machine-readable elements, each of the one or more machine-readable elements being associated with a physical object disposed in the facility;

store, in memory, information associated with each of the physical objects associated with the scanned one or more object machine-readable elements;

scan the terminal machine-readable element rendered on the display of the at least one terminal; and in response to scanning the terminal machine-readable element, automatically transfer the information associated with each of the physical objects, stored in the memory, and terminal identifier encoded in the terminal machine-readable element to the local computing system, wherein in response to receiving the information associated with each of the physical objects from the at least one of the plurality of mobile devices, the local computing system publishes a message including the information associated with each of the physical objects on the at least one named logical channel and transfers the information to the at least one terminal.

2. The system of claim 1, wherein the at least one named logical channel is associated with the terminal number.

3. The system of claim 2, wherein the at least one terminal is configured to subscribe to the at least one named logical channel.

4. The system of claim 1, wherein the at least one terminal is configured to:
detect the message published in the at least one named logical channel;
import the information of each physical object included in the message; and
display information of each physical object on the display.

5. The system of claim 1, the local computing system comprising a server and a controller.

6. The system of claim 5, wherein the server is configured to generate the message and transmit the message to the controller.

7. The system of claim 6, wherein the controller is configured to format the message prior to publishing the message.

8. The system of claim 1, wherein the at least one mobile device is configured to:
decode an object identifier from each of the one or more object machine-readable elements;
transmit each decoded identifier to the local computing system;
receive the information of each physical object, in response to transmitting each decoded identifier to the local computing system; and
display the information of each physical object on the display.

9. The system of claim 1, wherein at least one mobile device is configured to:

decode the terminal number from the terminal machine-readable element; and
transmit the terminal number to the local computing system.

10. The system of claim 9, wherein the local computing system is configured to:
determine the at least one named local channel to which to publish the message based on the terminal number.

11. A method for data transfer in a distributed environment, the method comprising:

displaying, via at least one of a plurality of terminals disposed in a facility, the plurality of terminals being in communication with a local computing system and each one of the plurality of terminals including a reader and a display, a terminal machine-readable element encoded with a terminal identifier associated with the at least one terminal;

subscribing, via the at least one of the plurality of terminals, to at least one named logical channel of a plurality of named logical channels to listen for information to be published in the at least one named logical channel;

executing, via at least one of a plurality of mobile devices operating in the facility, the plurality of mobile devices being in communication with the local computing system, and each one of the plurality of mobile devices including a reader, a memory an application for interacting with the local computing system;

scanning, via the at least one of the plurality of mobile devices, using the reader, one or more object machine-readable elements, each of the one or more machine-readable elements being associated with a physical object disposed in the facility;

storing, via the at least one of the plurality of mobile devices, in memory, information associated with each of the physical objects associated with the scanned one or more object machine-readable elements;

scanning, via the at least one of the plurality of mobile devices, the terminal machine-readable element rendered on the display of the at least one terminal;

in response to scanning the terminal machine-readable element, automatically transferring, via the at least one of the plurality of mobile devices, the information associated with each of the physical objects, stored in the memory, and terminal identifier encoded in the terminal machine-readable element to the local computing system;

in response to receiving the information associated with each of the physical objects from the at least one of the plurality of mobile devices, publishing, via the local computing system including a processor and a database, a message including the information associated with each of the physical objects on the at least one named logical channel; and transferring, via the local computing system, the information to the at least one terminal.

12. The method of claim 11, wherein the at least one named logical channel is associated with the terminal number.

13. The method of claim 12, further comprising subscribing, via the at least one of the plurality of terminals, to the at least one named logical channel based on the terminal number.

14. The method of claim 11, further comprising:
detecting, via the at least one of the plurality of terminals, the message published in the at least one named logical channel;

importing, via the at least one of the plurality of terminals, the information of each physical object included in the message; and displaying, via the at least one of the plurality of terminals, information of each physical object on the display.

15. The method of claim 11, wherein the local computing system comprising a server and a controller.

16. The method of claim 15, further comprising generating, via the server, the message and transmit the message to the controller.

17. The method of claim 16, further comprising formatting, via the controller, the message prior to publishing the message.

18. The method of claim 11, further comprising:
decoding, via the at least one mobile device, an object identifier from each of the one or more object machine-readable elements;

transmitting, via the at least one mobile device, each decoded identifier to the local computing system;

receiving, via the at least one mobile device, the information of each physical object, in response to transmitting each decoded identifier to the local computing system; and displaying, via the at least one mobile device, the information of each physical object on the display.

19. The method of claim 11, further comprising:
decoding, via the at least one mobile device, the terminal number from the terminal machine-readable element; and transmitting, via the at least one mobile device, the terminal number to the local computing system.

20. The method of claim 19, further comprising:
determining, via the local computing system, the at least one named local channel to which to publish the message based on the terminal number.

* * * * *